UNITED STATES PATENT OFFICE.

LUDWIG WEISZ, OF BUDAPEST, AUSTRIA-HUNGARY.

PROCESS OF BRIQUETING METALLIC IRON.

943,724.  Specification of Letters Patent.  Patented Dec. 21, 1909.

No Drawing. Original application filed October 21, 1905, Serial No. 283,784. Divided and this application filed February 8, 1908. Serial No. 415,005.

*To all whom it may concern:*

Be it known that I, LUDWIG WEISZ, civil engineer, a subject of the King of Hungary, and residing at 70 Izabella-utcza, in the city of Budapest, Austria - Hungary, have invented certain new and useful Improvements in the Process of Briqueting Metallic Iron, of which the following is a full, clear, and exact specification.

My invention relates to a process of briqueting metallic iron, or other metallic substance electropositive to carbon, utilizing carbonaceous material and lime water to assure the binding together of a mass or briquet formed therefrom.

The present application is a division of my application, Serial No. 283784, filed October 21, 1905, and which has resulted in United States Patent No. 899581, dated September 29, 1908.

In the carrying out of my present invention, scrap iron or other iron refuse for remelting, is mixed with a flux (such as limestone, ferromanganese, ferrosilicium, and the like), and with carbonaceous material—fuel, graphite or charcoal—moistened with lime water. The mass is thereafter pressed into the form of briquets or otherwise. The lime water forms, with the iron and the carbonaceous material (graphite or charcoal), an electric element, and the form-pieces may be considered as an endless number of short-circuited galvanic couples, in which oxygen, produced by the decomposition of lime-water, is transferred to the iron electrode, oxidizes the same and thus converts it into a cement, while the hydrogen passes to the charcoal electrode, and is there burned to water by the oxygen absorbed in the charcoal, and thus regenerates the electrolyte. These phenomena are rendered perceptible by the heating of the briquets up to 80–100° Celsius, and disappear within 36 hours. After cooling down, the briquets—forming very compact, waterproof pieces—yield, when melted, in a cupola furnace, 94%–96% excellent iron, or they can be roasted in a suitable furnace, and thereafter passed between rollers.

I am aware of the United States Patent No. 250006, of November 22, 1881, in which the patentee emphasizes the statement that his process consists in making a slab, block or lump, of iron-ore by cementing the finely-divided iron ore and particles of cast iron or steel by oxidation. My process is intended for making briquets of metallic iron—not of iron ore—for use, especially, in the cupola furnace, whereas a resultant of oxidation cannot be reduced to iron in either the cupola furnace or in the reverberatory furnace, but goes over into slag, with a loss of iron. To reach the result sought by me, I do use lime, which cannot lead to oxidation at all, and use this with carbonaceous material.

A difference in result, distinctive of my process—especially as compared with that of United States Patent 250006—is readily ascertained by the following experiment. Iron filings, when moistened in a glass, rust together as stated in said patent, and a reddish body, principally oxid, is produced. By my process, the result of mixing iron filings with charcoal powder and lime moistened with water, is a hard black body which consists essentially of metallic iron. The product of Patent 250006 is a raw product which must be reduced in a blast furnace, if to be useful, while the product of my process is ready and needs only to be remelted in a cupola furnace or in a reverberatory furnace.

What I claim is:

1. The method of briqueting metallic iron, consisting in mixing metallic iron with carbonaceous material and lime water, and pressing the mixture into the form of briquets.

2. The method of briqueting metallic iron, consisting in mixing metallic iron with carbonaceous material moistened with lime water, and pressing the mixture into the form of briquets.

3. The method of briqueting metallic iron, consisting in mixing metallic iron, fluxing material and with carbonaceous material, moistening said material with an alkaline aqueous solution capable of acting as an electrolyte between the carbonaceous and the iron particles, and thereafter forming the mixture into briquets.

4. The method of briqueting metallic substances electropositive to carbon, consisting in mixing such substances with fluxing material and with carbonaceous material, moistening the mixture with an alkaline aqueous solution capable of acting as an electrolyte between the carbonaceous material and said metallic substances, and thereafter forming the mixture into briquets.

In testimony whereof I affix my signature in the presence of two witnesses.

LUDWIG WEISZ.

Witnesses:
JACQUES KALMAN,
CHARLES EDWARD ZATUM.